March 25, 1952 W. S. CLOUD 2,590,379
APPARATUS AND METHOD FOR WRAPPING ARTICLES AND
SEVERING THE WRAPPED ARTICLES FROM WEBS
Filed Feb. 16, 1949 4 Sheets-Sheet 1

Inventor
William S. Cloud
By Laughlin Mum
Atty.

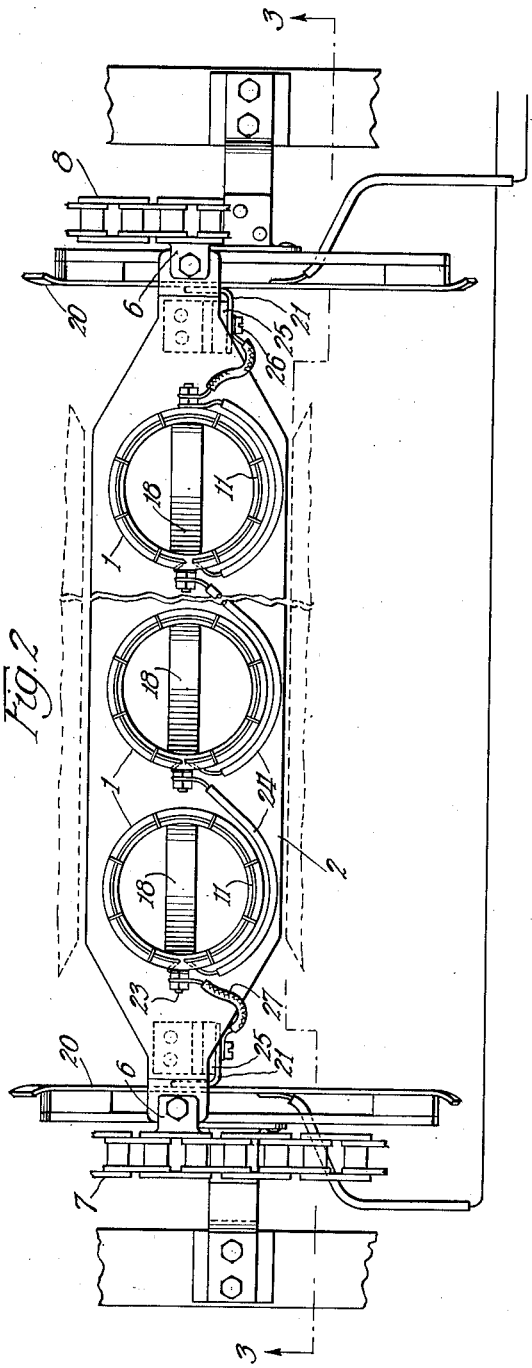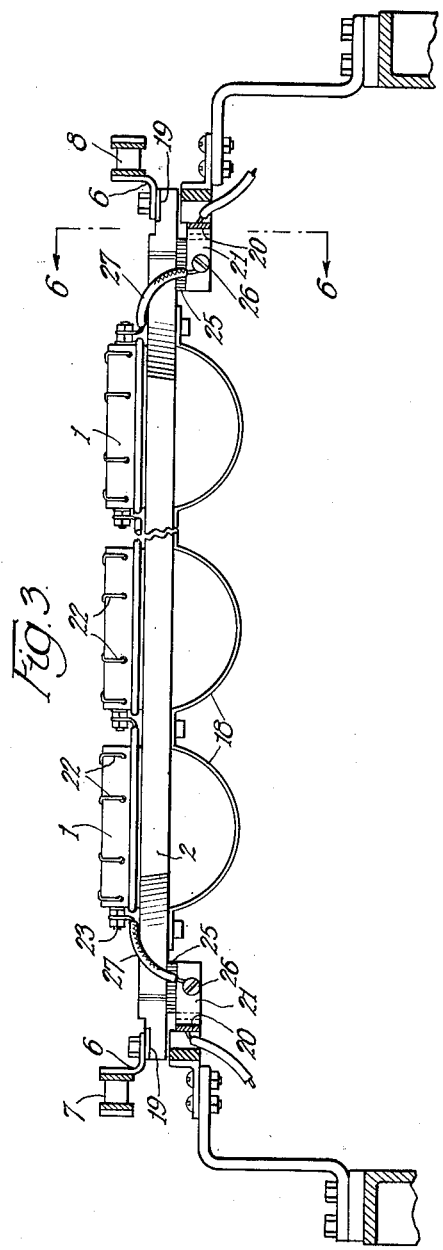

Inventor
William S. Cloud.
By: Langun Mum
Atty.

March 25, 1952 W. S. CLOUD 2,590,379
APPARATUS AND METHOD FOR WRAPPING ARTICLES AND
SEVERING THE WRAPPED ARTICLES FROM WEBS
Filed Feb. 16, 1949 4 Sheets-Sheet 4
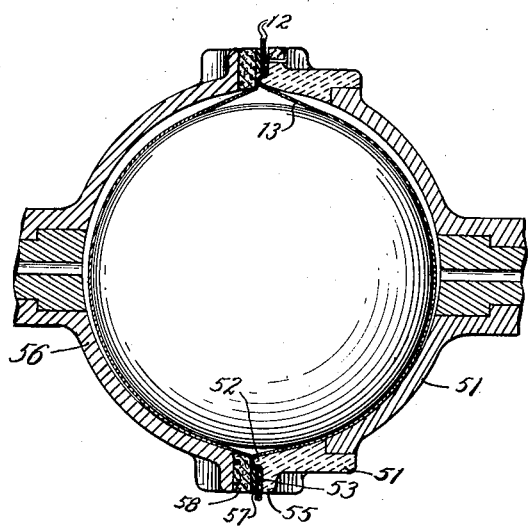
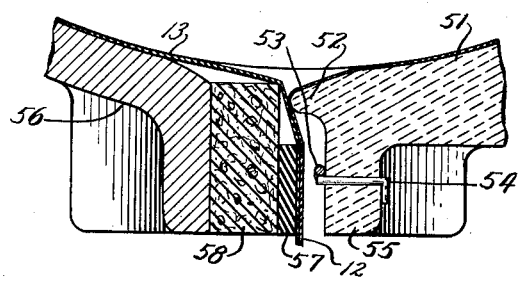
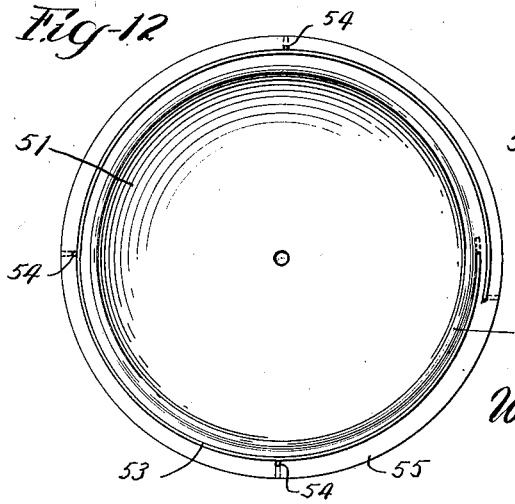
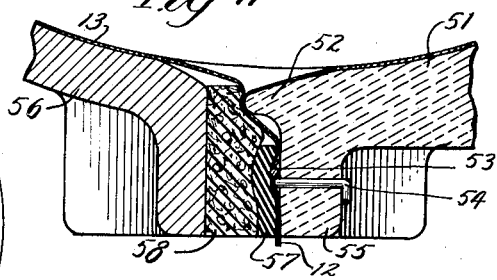
Inventor
William S. Cloud
By:-
Louis Robertson
Atty.

Patented Mar. 25, 1952

2,590,379

UNITED STATES PATENT OFFICE 2,590,379

APPARATUS AND METHOD FOR WRAPPING ARTICLES AND SEVERING THE WRAPPED ARTICLES FROM WEBS

William S. Cloud, Wilmette, Ill.

Application February 16, 1949, Serial No. 76,808

30 Claims. (Cl. 18—1)

1

This invention relates to machines for wrapping articles in thermoplastic material, and more particularly to improvements in cut-off means for severing the wrapped articles from the stock of wrapping material.

In my copending application, Serial No. 692,323, filed August 22, 1946, now Patent No. 2,490,781, issued December 13, 1949, I disclose a wrapping machine in which two webs of thermoplastic material, such as rubber hydrochloride, are drawn from rolls thereof and advanced toward each other over heating drums, through stretching means and over and between mating packaging drums. Each packaging drum has pocket-forming molds about its circumference, so that as the pockets in the two drums approach each other an article may be deposited therein, and upon further rotation may be enclosed by the thermoplastic material and sealed by the mating molds.

The operation of such a machine results in the two strips being sealed together with the article sealed between them. Ordinarily it is necessary or desirable to provide means for severing the wrapped article from the two strips which embrace it.

A number of obstacles are presented in the severing operation. In being forced into the molds, the strips are stretched. Thermoplastic wrapping materials which have been heated and stretched will retract upon being released, some to a greater degree than others, of course. Also the particular type of thermoplastic material which I prefer to use is heat-sealable, i. e., when two heated sheets are brought into contact with each other, they become welded or stuck together. The expedient of simply providing cutting knives or wires around the molds would permit the sheets to retract around the cut portion, resulting in an uneven cut at best. If successive articles are to be severed from the web, the portion of the sheet from which an article has been cut may snap back to contact and become stuck to the next article.

According to the present invention the wrapped articles are successfully severed by resiliently gripping the web along carefully chosen lines so related to the line of severance, the article and the web that the article is evenly severed and snapping back of the web is prevented.

Other objects and advantages of my invention will be apparent from the following description and from the drawings, in which:

Figure 1 is a view in side elevation of one form of the invention chosen for illustration as applied to a wrapping machine, with parts broken away and parts shown in section.

2

Fig. 2 is an enlarged fragmentary top plan view of the severing device of Fig. 1 showing the wiping electrical connection.

Fig. 3 is a view in transverse, vertical section, taken on the line 3—3, Fig. 2, looking in the direction of the arrows.

Figure 5:
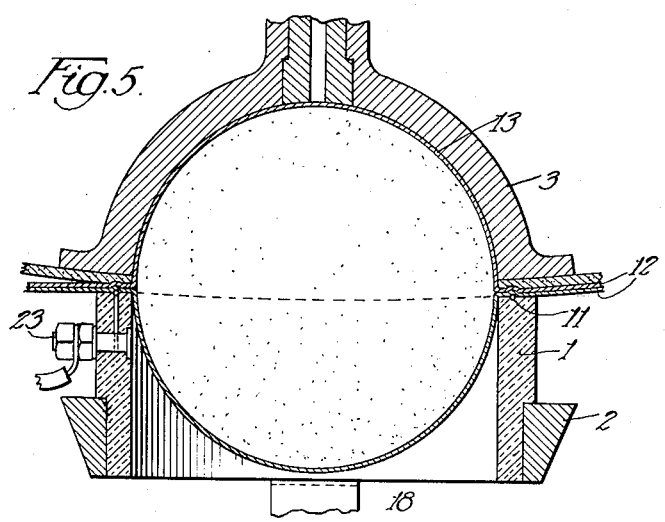
Fig. 5 is a view in vertical section, taken on the line 5—5, Fig. 4, with parts shown in elevation and a contacting mold in section.

The remaining figures show a modification of the invention, which I prefer for some purposes, as follows:

Fig. 9 is a view in horizontal section corresponding somewhat to Fig. 5 of a modified form of the invention, being taken on a horizontal axial plane through the two packaging drums, the separate cut-off cups of Figs. 1 to 6 not being necessary with this form of the invention.

Figs. 10 and 11 are enlarged detail views in section of the rims of cups 51 and 56, showing the relative positions of the strips of stretched film 12 and the cutting wire 53 as the two drums revolve.

Fig. 12 is a face view of cup 51 of Figs. 9–11.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements or combinations in which the inventive concepts are found.

The form of improved severing device shown in Figs. 1–6 may be used, for example, in conjunction with the wrapping apparatus of my prior copending application, Serial No. 692,323, with which it has been illustrated somewhat diagrammatically. The disclosure of said application is hereby incorporated herein by reference. The form of the invention shown in Figs. 1 to 6 includes a plurality of severing and holding cups 1, carried upon transverse supports 2, corresponding in number to the cups in the transverse rows of packaging molds 3 of the wrapping drums 4 and 5 to be aligned therewith.

The opposite ends of each transverse support are carried on brackets 6 mounted upon oppositely disposed links of endless chains 7 and 8 traveling over sprocket wheels 9 and 10 in unison with the rotation of the wrapping drums to bring the severing cups in alignment with the packaging molds of the drum 4.

Figure 7:
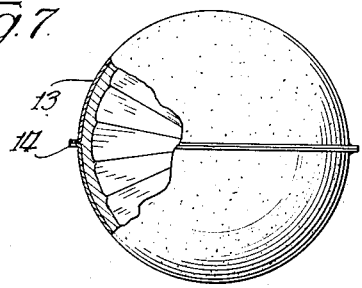
Fig. 7 is a view in front elevation of a wrapped article just severed from the stock of wrapping material still held in stretched condition by the machine with parts broken away.

The holding and severing cups 1 are preferably made of refractory or other heat and electrical insulating material of a diameter sufficient to receive the packaged article. These cups are open at the bottom and shouldered upon the exterior walls to be snugly received within circular openinsg provided therefor in the transverse supports 2 with the shoulders in engagement with the upper surface of the supports. The top of the side walls or rim of each cup is curved to conform to the curved surface of the drums and mounts a circular electrical resistance wire loop 11, adapted to be brought into engagement simultaneously throughout the loop with the welded films of stretched wrapping material 12 extending between the packaged articles, and when energized to become sufficiently heated to sever the packaged article 13, leaving a circumferential outstanding sealed flange 14, as shown in Fig. 7.

One pair of sprocket wheels 9 over which the endless chains 7 and 8 travel is carried upon a shaft 15 mounted in bearings upon the side frame of the wrapping machine with its axis parallel to the axes of the wrapping drums and in substantially vertical alignment below the contacting surfaces of the said drums in such a manner that the cups 1 in the transverse supports will follow the movement of the packaged articles 13 carried between the welded strips of stretched film 12 in traveling with one of the wrapping drums 4. The other sprockets 10 are carried on a similar shaft 16 mounted in bearings upon the side frames arranged at the other side of and below the packaging drum. By means of idler sprockets 17, also mounted upon the side frame of the machine, the endless chains 7 and 8 are caused to travel about the first sprockets 9, follow the movement of the packaging drum 4 so that the cups 1 receive in succession the newly packaged article 13 to bring the severing wires in contact with the welded stock 12 between the packaged articles and sever the packaged articles therefrom. The rows of cups 1 on each transverse support 2 are provided with means to prevent the packaged article from passing therethrough, such as the narrow semicircular strip 18 attached upon the underside of the support, as shown in Fig. 3, until they are discharged in passing over the second sprocket, as shown in Fig. 1.

Figure 1:
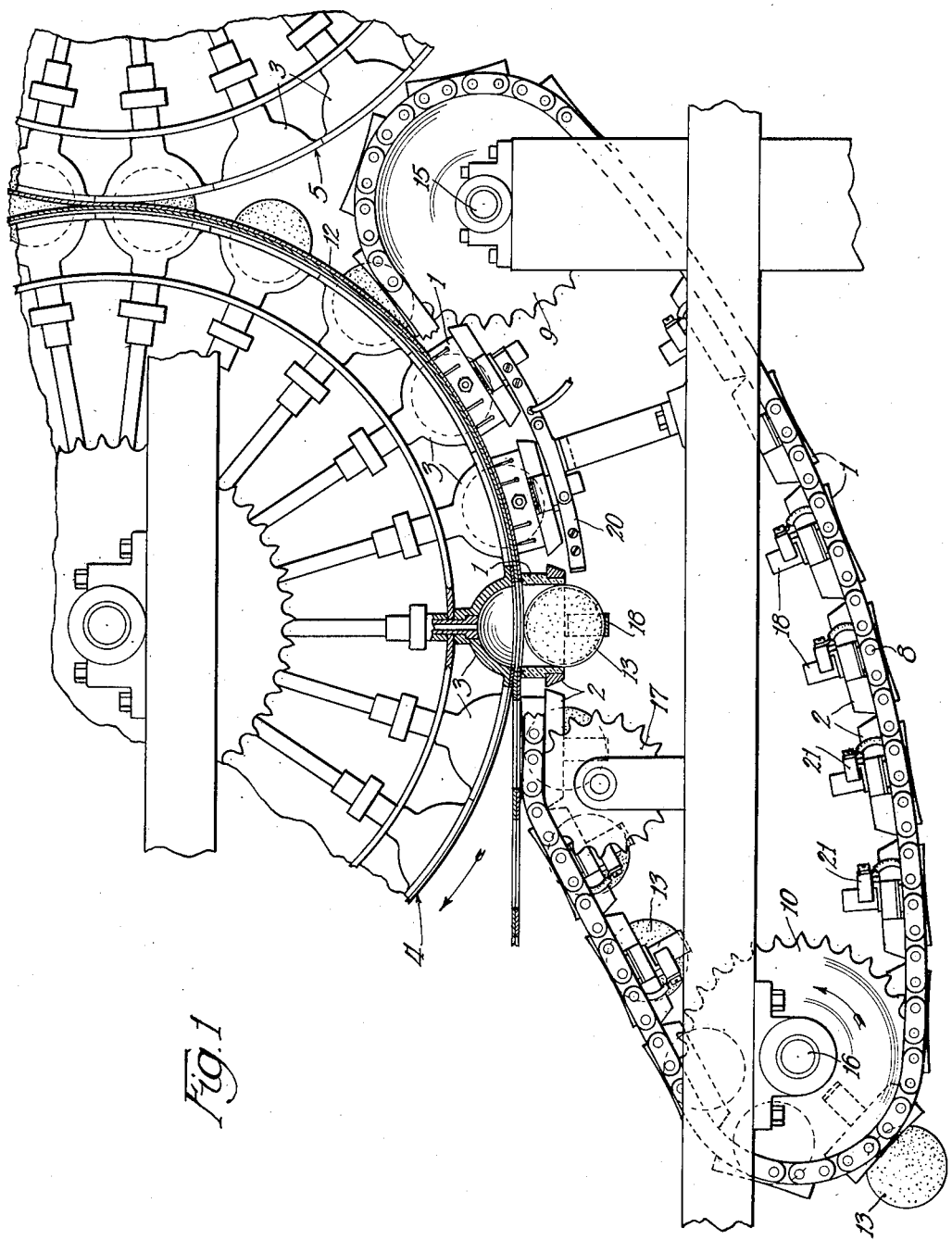
Figure 4:
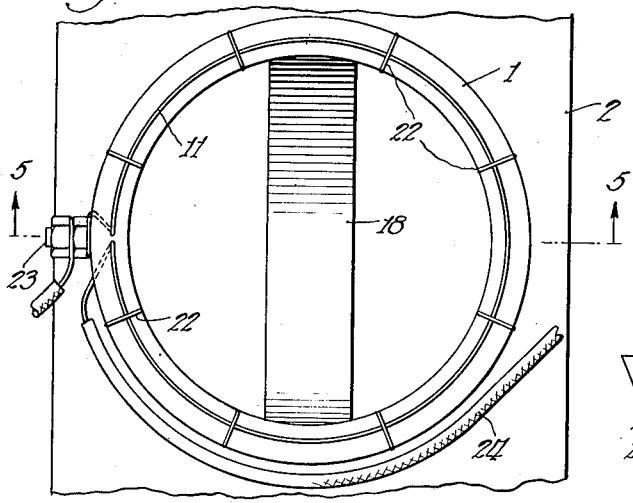
Fig. 4 is an enlarged detail top plan view of a severing cup.
Figure 6:
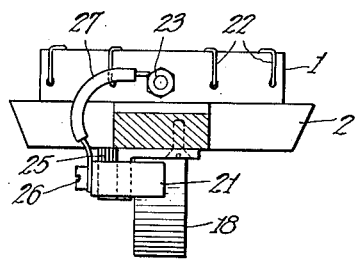
Fig. 6 is an enlarged detail view in section taken on the line 6—6, Fig. 3, of the stationary member of the sliding electrical connection.

As shown in Fig. 1, the front edges of the cups traveling over the sprocket wheels 9 in the direction of the wrapping drum may engage the stock of wrapping material between the packaging cups before the entire top or rim of that particular cup is brought into engagement with the stock about the particular packaged article to be received within said cup. It may be desired to interpose a resilient pad 19 of rubber, or the like, between the chain-borne brackets 6 and ends of the transverse cup supports 2 to allow the cups to tilt when their front edges first engage the wrapping drum 4 to prevent rupture of the stock between the wrapped article and then to ensure complete contact of the rim of the cup with the stock 12.

The sprocket wheels 9 are arranged sufficiently above the lowermost point of the drum 4 and a sufficient distance to the right thereof to coact with the idler sprockets 17 arranged to the left and below the lowermost point of the drum 4 to carry the cups 1 on the endless chains 7 and 8 to bring the rims in contact successively throughout with the lips of the molds 4 a sufficient time in advance to ensure a contact of the rim throughout with the sealed stock of film between the molds before the electric circuit is established to sever the packaged article from the stock of film, and at the same time transport the packaged article within the cups 1 and allow the perforated stock of film from which the packaged article has been severed to be withdrawn from the molds 4 in a plane tangential to the drum 4. The adjustment of the idler sprockets 17 maintains the cups 1 in this engagement with the drum 4 through the chains 7 and 8.

Figure 8:
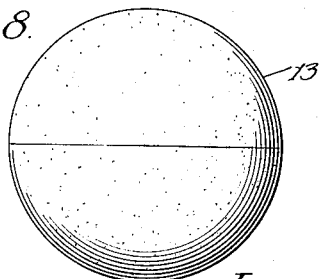
Fig. 8 is a similar view of a wrapped article showing, by comparison with Fig. 7, the shrinkage of the seal after being released.

As the wire loops severing the packaged article 13 must necessarily be of greater diameter than the article, the circumferential outstanding flange 14 is formed upon the package when the severing occurs, as shown in Fig. 7. As thermoplastic film, such as rubber hydrochloride, being heated and stretched, shrinks upon release, the flanges 14 when severed shrink upon being released from engagement between the cup and drum to form a transparent, inconspicuous seal as shown in Fig. 8.

To complete an electric circuit through the wire loops 11 on the severing cups, two arcuate electrical contacts 20 are supported on the side frames of the machine which are connected in the commercial circuit and are so arranged that, when the severing cup is in position to sever the stock, the spring contacts 21 on each end of the supports will engage the stationary arcuate contacts and will wipe over them initiating and maintaining the current through the loops on the cups until the packaged article is severed from the stock while the stock is engaged between the cup and the drum. When the stock is released the article then falls gently into the cup and engages the strap 18 to be carried over the sprocket 10 and be discharged therefrom, as by being dropped gently onto a conveyor (not shown) just below sprocket 10.

Power may be applied to either sprocket shaft in any desired manner from the prime mover of the machine to drive the endless chains at the desired speed.

The circular resistance wire loops 11 may be received within the circular grooves in the top or rim of the cups and cemented therein or held in place by wire ties 22, as shown in Figs. 2 and 3. It is preferable to extend one end of the wire loop 11 in each cup through the body of the wall to an external binding post 23 and the other end to a connecting lead 24 to be engaged with the binding post 23 on the cup next in line. Each of the spring wiping contacts 21 on each end of each cup support 2 are mounted on a block 25 on the underside of the support 2 and are connected to a binding post 26 thereon. At one end this binding post 26 is connected by a lead 27 to the binding post 23 on the cup at that end and the lead 24 from the cup at the other end is connected to the binding post 26 on the block at that end. Or, if desired, that cup may be provided with an additional binding post to which the lead 24 is attached and a lead similar to lead 27 may connect this binding post to post 26.

Modification

Although the modification shown in the drawings beginning with Fig. 9 differs in many respects from the form of the invention shown in Figs. 1 to 8, it is very similar in the broader aspects. Although it may not be practical with this form of the invention to have all parts of the film held around a portion being cut, a construction is provided which holds the necessary parts thereof. Particularly, a special raised rim 52 is utilized so that the films are properly held and are not prematurely cut.

As best shown in Figs. 10 and 11, molds or cups 51 of wrapping drum 4 (Fig. 1) are preferably made, in whole or in part, of refractory or other heat and electrical insulating material, such as the cement and asbestos mixture sold under the trade name "Transite."

The rims or edge portions 52 of the shoulders of molds 51 extend beyond the balance of the shoulders a distance substantially greater than the diameter of severing wire 53. Mounted on the balance of the shoulders, in similar manner to that described above with respect to wires 11 and having similar electrical connections, are electrical resistance wire loops 53. Preferably, the securing wires 54 are confined to the Transite flange 55 instead of passing through the side wall of the cavity.

The shoulders of molds 56 on drum 5 (Fig. 1) may be surfaced, at least opposite wire 53, with a heat and electrical insulating resilient material 57, such as the rubber-like composition sold under the trade name "Silastic Rubber." Rings cut from ordinary truck inner tubes have been found satisfactory, however. This surfacing material is resiliently cushioned, as by a layer of sponge rubber 58 which also bears against rib 52.

Severing wires 53 may be heated in identical manner to that described above with respect to wires 11 except that the contacts 20 will be positioned adjacent drum 5 to be wiped by spring contacts 21 (which will be carried by drum 5) either while or slightly before mold 51 engages mold 56. The wiping contact may continue until slightly after the said molds separate. Contact 20 is preferably adjustably positioned.

In the operation of this modification, as is best seen in Figs. 10-12, revolution of drums 4 and 5 brings together in a rocking contact molds 51 and 56, into which have been forced parts of the two strips of thermoplastic material. As the molds approach, a part of the strips surrounding the molds is gripped between the edge portion 52 of mold 51 and the cushion 58, welding the strips together at the contacting portions. As the molds approach closer, the balance of the shoulder of mold 56 forces the welded films 12 into contact with severing wire 53 which, if not already heated to sever a portion of the gripped films, is heated before separation. Further revolution of drums 4 and 5 causes succeeding film portions to be gripped and severed to completely sever the enclosed article 13 from the films and release the gripped portion thereof.

While I have illustrated only an elevated rib 52 positioned between the wrapped article and the severing means, and experience indicates that this suffices in my practice of this invention, it may be desirable in some uses of the invention to also provide a similar elevated rib (and cooperating structure) on the other side of said severing means.

The single rib is preferred for economy of space between the molds and consequent economy of material. It may be surprising that one rib will hold the web properly, because the material on the other side of the cut from the rib would be expected to snap back. Nevertheless, the structure of Figs. 9 to 12 has been found satisfactory. Although rubber ring 57 does not always squeeze the web against flange 55 both ahead of the cut and behind it, it squeezes close enough to the cut with a gripping action that follows along as the cut progresses, so that the material does not get out of control. The wire should not be hot enough to melt the web with extreme rapidity. Its temperature is adjustable by a rheostat (61 in Fig. 2) and is controlled for reliably severing the web without permitting the web to snap back and pile up because of being severed too soon.

In the illustrated form of the invention rib 52 is constructed of rigid material and is positioned to press against a cushion 58, but rib 52 may (at least theoretically) be constructed of a resilient material, such as rubber, and mate with rigid material, or both may be resilient. However, a rigid rib 52 is much preferred because there is no danger that the tension developed in the web during packaging will compress the rib enough to draw the web closer to the wire with consequent danger of being severed prematurely.

From the foregoing it is seen that both forms of the invention provide a practical combination of stretch-wrapping and cut-off mechanisms. In both forms the wrapper halves are sealed together inside of the cut so that there is no danger that the two halves will be pulled apart by their tension as they are severed from the webs by the hot wire. In both forms, also, the webs are progressively held in such relation to the cut that there is no objectionable snapping away from the cut as the cutting progresses. Figs. 1 to 8 represent the ultimate holding, in that the webs are held all around the line of cut inside and outside the cut. In Figs. 9 to 12, the holding is not so complete, but has been found to be sufficient to satisfy the rigid requirements of cutting the wrapped articles from the stretched webs.

This application is, in part, a continuation of my application, Serial No. 536,014, filed May 17, 1944, abandoned October 13, 1950.

The molds 3, 51 and 56 do not necessarily perform any molding function. The web need never be pressed into contact with them. Accordingly, they may be referred to as openings in the drums. Likewise, the severing cups 1 may be referred to as severing rings or rims, and the flanges 55 and rib 52 may likewise be regarded as a severing ring or rim.

I claim:

1. A machine for successively wrapping a plurality of articles in thermoplastic material, including means for encasing each article between two stretched sheets of said material wherein the sheets are further stretched about each article, brought together and heat sealed while under tension; and means for severing the wrapped articles from the sheets of heat sealed material; said encasing means holding the stretched heat sealed sheets of material against retraction until after the severing operation; said severing means including a sagging conveyor, a plurality of cups carried thereby, and support means for the conveyor disposed to bring the cups into position to successively embrace the wrapped articles and engage the heat sealed sheets between the articles before, during and after the severing operation.

2. The structure of claim 1 wherein said severing means includes a loop of electric resistance wire about the rim of each cup and means to connect said wire in an electric circuit to heat it sufficiently to sever the stretched sheets of heat sealed material approximately close to the wrapped article as the cup embraces a wrapped article.

3. A machine for wrapping articles in thermoplastic material wherein strips of heated film of said material are passed over similar contacting packaging drums, each having a plurality of registering openings for receiving the film and the article to be wrapped to encase the article as the drums contact each other, seal the films to each other between the packaged articles and carry the packaged article and sealed stock of film about one drum, comprising means for severing the encased articles from the sealed stock of film and carrying the severed articles from the machine, including a plurality of severing cups adapted to embrace the wrapped articles and means for advancing said cups to completely embrace the wrapped articles advanced upon the drum and engage the rims of the cups with the stock of sealed film between the packaged articles to sever the article therefrom.

4. The structure of claim 3 wherein the rim of each cup mounts a loop of electrical resistance wire energized when a cup embraces an article.

5. The structure of claim 3 wherein the rim of each cup mounts a loop of electrical resistance wire, and wherein each loop of wire is connected to wiping contacts to wipe over arcuate stationary contacts to establish an electric circuit through the wire of the cup engaging the stock as a cup embraces an article.

6. The structure of claim 3 wherein the cups are mounted upon supports carried between parallel endless chains traveling over spaced apart pairs of sprocket wheels, one pair mounted upon a shaft having an operative connection to the prime mover of the machine arranged to advance the cups in unison with the rotation of the packaging drums.

7. A machine for wrapping articles in thermoplastic material wherein the strips of said material are advanced from opposite ends of the machine toward each other over means for heating the strips, through means stretching the heated strips into thin films, and then moved over similar contacting packaging drums each having a plurality of similar package forming openings arranged in registering positions to receive and wrap the article with the stretched films between the articles sealed to each other carried over one drum; comprising a cut-off device for severing the stock of stretched sealed film between the packaged articles including a plurality of severing rings arranged to be brought in register with the openings containing the wrapped articles, means to advance the severing rings to embrace the wrapped articles and to successively engage the rims of the advancing rings with the stretched stock of film between the packaged articles to hold said film against contraction, normally inoperative severing means upon the rims of each of said rings, means to render said severing means operative after the entire rim of a ring engages the stretched stock, means to receive and transport the severed articles and discharge the said article at a distance from the wrapping machine.

8. The structure of claim 7 wherein the severing rings are carried on transverse travelling supports and wherein the supports are resiliently mounted upon the advancing means to allow the supports to tilt as the forward rims of the rings engage the drum.

9. The structure of claim 7 wherein the severing rings are carried on transverse traveling supports and wherein the means for advancing the severing rings includes endless chains carrying the transverse supports and wherein the ends of the supports are provided with brackets secured to the links of the endless chains and are provided with elastic cushions between the brackets and supports.

10. The structure of claim 7 wherein the severing means upon the rims of the rings includes electrical resistance wire.

11. The structure of claim 7 wherein the stretched, sealed films between the wrapped articles are engaged by the rims of the rings preceding, during and succeeding the severing operation to hold said films against shrinking.

12. Apparatus for severing wrapped articles from a web of elastic film passing around a drum in elastically stretched condition including a plurality of rims shaped to conform to the web on the drum around the articles and a sagging conveyor carrying the rims successively into position surrounding successive wrapped articles and clamping the web against the drum, and holding it so clamped to hold the material of the web against contraction, and means for severing the wrapped articles from the web while the surrounding material is so held.

13. Apparatus for severing wrapped articles from a web of elastic film passing around a drum in elastically stretched condition including a plurality of rims shaped to conform to the web on the drum around the articles and a sagging conveyor carrying the rims successively into position surrounding sucessive wrapped articles and clamping the web against the drum, and holding it so clamped to hold the material of the web against contraction, and means for severing the wrapped articles from the web while the surrounding material is so held.

14. Apparatus for severing wrapped articles from a web of film in elastically stretched condition including web severing means adapted to substantially surround successive wrapped articles to cut them from the web, cooperating web holding means engaging opposite faces of the web, means for mounting said holding means to move with and grip said web, as it passes therebetween, through a sufficient distance longitudinally of the web to encompass an article and the severing means surrounding it, said holding means being constructed to hold the web surrounding an article and its associated severing means and also between the severing means and the article against contraction during the entire severance of the article.

15. Apparatus for severing wrapped articles from a web of film in elastically stretched condition including web severing means adapted to substantially surround successive wrapped articles to cut them from the web, cooperating web holding means engaging opposite faces of the web, means for mounting said holding means to move with and grip said web, as it passes therebetween, through a sufficient distance longitudinally of the web to encompass an article and the severing means surrounding it, said holding means being constructed to hold the web surrounding an article and its associated severing means against contraction during the entire severance of the article.

16. The apparatus of claim 15 in which the severing means comprises wire substantially surrounding each article at the time of severance to sever it from the web and electrical connections for heating said wire.

17. The apparatus of claim 16 in which the holding means are positioned to engage and hold the web surrounding the wire around an article and between the wire and the article.

18. The apparatus of claim 17 including means to maintain the wire ineffective to sever the web until the web on each side thereof is held.

19. The apparatus of claim 15 in which the severing means comprises wire substantially surrounding each article at the time of severance to sever it from the web and electrical connections for heating said wire, and including means for maintaining the wire ineffective to sever the web until the web adjacent the wire is held.

20. Apparatus for severing wrapped articles from a web of film in elastically stretched condition including cooperating web holding means adapted progressively to engage opposite faces of the web adjacent successive wrapped articles and hold portions of the material of the web against contraction, and web severing means adapted progressively to sever at least part of the web surrounding said articles while the said material is so held between the point of severance and the said articles; said web holding means comprises a first series of rims shaped to surround the said articles, a second series of similarly shaped rims mounting severing means, and means for progressively clamping at least parts of successive rims of the said first series against at least parts of successive rims of said second series with progressive portions of the web adjacent said articles therebetween.

21. The apparatus of claim 20 in which each rim of the first series mounts at least one elevated rib positioned to engage a portion of the cooperating rim of the second series, with a portion of the web therebetween, and hold the web before the severing means becomes effective.

22. Apparatus for wrapping articles in elastic material and severing the wrapped articles therefrom including a pair of cooperating wrapping drums having mating article-receiving openings, means for rotating the drums to advance the openings toward one another with stretched elastic material applied continuously over each drum and pocketed into the openings to enclose articles fed to the pockets thus formed, severing means surrounding certain of said openings, an elevated rib between the recesses and the severing means holding the web away from the severing means, and a resilient cushion surrounding the recesses mating therewith to press the web first against the raised rib and thereafter, while holding it against the rib, press it against the severing means adjacent thereto.

23. Apparatus for wrapping articles in elastic thermoplastic film and severing them therefrom including means for stretching two approaching strips of such material by forming pockets therein while holding the sheet outside of the pockets and for bringing the strips together to enclose articles between pairs of facing pockets to enclose the articles successively and join the strips into a single web, and including cooperating web-holding means for engaging opposite faces of the web adjacent successive wrapped articles progressively around each article and holding portions of the material of the web against contraction, and heated web severing means adapted to sever at least part of the web surrounding said articles; said web-holding means being positioned, in part at least, between the severing means and the article whereby said material is held between the point of severance and the said articles so that the pockets do not pull apart as severed.

24. The method of wrapping articles comprising enclosing said articles successively between two strips of elastic thermoplastic film by pressing pockets in said film while holding the film outside of the pockets, and bringing successive pairs of facing pockets together around the articles, thus forming a common web; and applying a hot member to the webs to sever the successive wrappers from the common web while holding the common web progressively around each article but continuously between the points of severance and the article to prevent the pockets from snapping away from each other.

25. Apparatus for wrapping articles in elastic thermoplastic film and severing them therefrom including means for stretching two approaching strips of such material by forming pockets therein while holding the sheet outside of the pockets and for bringing the strips together to enclose articles between pairs of facing pockets to enclose the articles successively and join the strips into a single web, and including cooperating web-holding means for engaging opposite faces of the web adjacent successive wrapped articles and holding portions of the material of the web against contraction, and heated web severing means adapted to sever at least part of the web surrounding said articles; said web-holding means being positioned, in part at least, between the severing means and the article whereby said material is held between the point of severance and the said articles so that the pockets do not pull apart as severed.

26. The method of wrapping articles comprising enclosing said articles successively between two strips of elastic thermoplastic film by pressing pockets in said film while holding the film outside of the pockets, and bringing successive pairs of facing pockets together around the articles, thus forming a common web; and applying a hot member to the webs to sever the successive wrappers from the common web while holding the common web continuously between the points of severance and the article to prevent the pockets from snapping away from each other.

27. Apparatus for wrapping articles in elastic thermoplastic film and severing them therefrom including means for stretching two approaching strips of such material by forming pockets therein while holding the sheet outside of the pockets and for bringing the strips together to enclose articles between pairs of facing pockets to enclose the articles successively and join the strips into a single web, and including cooperating web-holding means for engaging opposite faces of the web adjacent successive wrapped articles and holding portions of the material of the web against contraction, and heated web severing means adapted to sever at least part of the web surrounding said articles; said web-holding means being positioned on both sides of each line of severance whereby said material is held between the point of severance and the said articles so that the pockets do not pull apart as severed, and beyond the lines of severance to prevent 28. The method of wrapping articles comprising enclosing said articles successively between two strips of elastic thermoplastic film by pressing pockets in said film while holding the film outside of the pockets, bringing successive pairs of facing pockets together around the articles, thus forming a common web; and applying a hot member to the webs to sever the successive wrappers from the common web while holding the common web continuously between the points of severance and the article to prevent the pockets from snapping away from each other and beyond the points of severance to prevent contraction of the web which tear the web before severance is complete.

29. Apparatus for wrapping articles in tacky elastic film and severing them therefrom including means for stretching two approaching strips of such material and for further stretching them by forming pockets therein while holding the sheet outside of the pockets and for bringing the strips together to enclose articles between pairs of facing pockets to enclose the articles successively and join the strips into a single web, and including cooperating web-holding means for engaging opposite faces of the web adjacent wrapped articles and holding portions of the material of the web against contraction, and web severing means adapted to sever at least part of the web surrounding said articles; said web-holding means being positioned on both sides of each line of severance whereby said material is held between the point of severance and the said articles so that the pockets do not pull apart as severed, and beyond the lines of severance to prevent contraction of the web which might tear the web before severance is completed.

30. The method of wrapping articles comprising enclosing said articles successively between two strips of tacky elastic stretched film by pressing pockets in said film while holding the film outside of the pockets, and bringing successive pairs of facing pockets together around the articles, thus forming a common web; and severing the successive wrappers from the common web while holding the common web continuously between the points of severance and the article to prevent the pockets from snapping away from each other and beyond the points of severance to prevent contraction of the web which might tear the web before severance is completed.

WILLIAM S. CLOUD.

REFERENCES CITED

The following references are of record in the file of this patent:

UNITED STATES PATENTS

| Number | Name | Date |
| --- | --- | --- |
| 2,232,783 | Hausheer | Feb. 25, 1941 |
| 2,301,086 | Snyder | Nov. 3, 1942 |
| 2,302,846 | Farmer et al. | Nov. 24, 1942 |
| 2,387,747 | Cowley | Oct. 30, 1945 |